(12) United States Patent
Shiraishi et al.

(10) Patent No.: US 6,574,961 B2
(45) Date of Patent: Jun. 10, 2003

(54) DIRECT-INJECTION ENGINE WITH TURBOCHARGER AND METHOD OF CONTROLLING THE SAME

(75) Inventors: Takuya Shiraishi, Hitachinaka (JP); Toshiharu Nogi, Hitachinaka (JP); Minoru Ohsuga, Hitachinaka (JP); Noboru Tokuyasu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/961,443

(22) Filed: Sep. 25, 2001

(65) Prior Publication Data

US 2002/0134081 A1 Sep. 26, 2002

(30) Foreign Application Priority Data

Mar. 23, 2001 (JP) ........................................ 2001-084006

(51) Int. Cl.⁷ .............................................. F02D 23/00
(52) U.S. Cl. ........................... 60/602; 60/605.1; 60/611
(58) Field of Search ................................ 60/602, 605.1, 60/605.2, 611; 123/564

(56) References Cited

U.S. PATENT DOCUMENTS

| 5,865,153 | A | * | 2/1999 | Matsumoto | ................. | 123/299 |
| 6,173,704 | B1 | * | 1/2001 | Komoriya et al. | .......... | 123/698 |
| 6,279,551 | B1 | * | 8/2001 | Iwano et al. | ................. | 123/564 |
| 6,314,940 | B1 | * | 11/2001 | Frey et al. | .................. | 123/431 |

* cited by examiner

Primary Examiner—Hoang Nguyen
(74) Attorney, Agent, or Firm—Crowell & Moring LLP

(57) ABSTRACT

In a direction-injection engine incorporating a turbocharger, fuel combustion is improved to enhance fuel economy within the high-load range of engine torque, and furthermore to control occurrence of smoke in the range of great load within the lean-burn range. Scavenging acceleration control is conducted to scavenge the exhaust gases in the combustion chamber by using at least one of the intake pipe pressure, the combustion chamber pressure, and the exhaust pipe pressure, and the fuel is injected twice during the intake stroke and the compression stroke.

5 Claims, 21 Drawing Sheets

DIRECT-INJECTION ENGINE WITH TURBOCHARGER AND METHOD OF CONTROLLING THE SAME

BACKGROUND OF THE INVENTION

1. Field of the Invention

This invention relates to a method of controlling a direct-injection engine incorporating a turbocharger and, more particularly, to a control method for improving fuel combustion during high-load operation to clean exhaust gases, thereby improving fuel economy.

2. Description of Related Art

A turbocharger has been used for increasing an engine torque. Generally, the turbocharger turns a turbine by the use of a high-temperature exhaust gas energy, and turns a compressor which is coupled with the turbine, to thereby compress the air to be taken into the engine. The use of the turbocharger allows the engine to take in a larger quantity of air than the quantity of exhaust gases for the purpose of increasing the engine torque.

On the other hand, in a lean-burn engine typified by the direct-injection engine, a lean air-fuel mixture is burned within the range of low-engine torque operation in order to enhance fuel economy. However, since the quantity of air which is determined by the desired quantity of fuel and the air-fuel ratio is limited by the quantity of engine exhaust gases, the operation range in which the engine is able to operate with a lean mixture is restricted to the range of low engine torque. For example, disclosed in the Japanese Patent Laid-Open No. Hei 11-36867 is a direct-injection engine provided with an intake air quantity increasing means, by which the quantity of intake air is increased when the required quantity of fuel determined by the state of engine operation exceeds a predetermined quantity of fuel.

A recent direct-injection engine is operated at a so-called lean air-fuel ratio for the purpose of enhancing fuel economy; that is, the internal-combustion engine is operated with an excessive-air mixture which is leaner than the mixture of theoretical air-fuel ratio. Furthermore, in the Japanese patent stated above, the supercharger is employed to supply an increased amount of air in an attempt to widen the operation range at the lean air-fuel ratio. The direct-injection engine equipped with such a supercharger operates, in the range of a great engine torque, at a rich air-fuel ratio at which the air-fuel ratio is more on the excess fuel side than the theoretical air-fuel ratio. This operation is performed on the basis of the following phenomenon. Within a high-load range where the engine is developing a great torque, the combustion temperature within the engine combustion chamber rises, likely to produce knocking undesirable to the engine. Usually, to prevent this, a means to lower the combustion temperature by retarding the ignition timing is used. This method, however, allows the exhaust gas temperature to rise. To lower the exhaust gas temperature, much of fuel is injected to cool the exhaust gases with the evaporative latent heat of fuel. Within a high-load range, therefore, the fuel is consumed more than required, resulting in a lowered fuel economy. In the Japanese Patent Laid-Open No. 2000-27427 is described the supercharging, which is effected by the use of a turbocharger to intensify in-cylinder air motion, fully mixing the intake air with much of fuel injected, and accordingly producing a good homogenous combustion. The above-described prior invention, however, is still not enough for improving fuel economy within a range of high load.

Therefore, in a low-load operation range of engine torque, lean-burn operation is able to enhance fuel economy. In a high-load operation range, however, there arises a lowering of fuel economy, on the whole, fuel economy is not improved under actual driving condition.

Furthermore, when the lean-burn air-fuel ratio has increased in the direct-injection engine incorporating the supercharger, there takes place such a problem that, within a comparatively great-load range of the lean-burn range, the fuel concentrates excessively in one part within the combustion chamber, causing smoke to occur.

SUMMARY OF THE INVENTION

In view of the above-described circumstances, it is a first object of this invention to improve combustion within the high-load range of engine torque to enhance fuel economy in the direct-injection engine incorporating the turbocharger. Furthermore it is a second object of this invention to restrain occurrence of smoke within a great load range in the lean-burn range in the aforesaid engine.

The direct-injection engine is comprised of a fuel injector capable of injecting the fuel directly into the engine combustion chamber, intake and exhaust valves assembled in the engine combustion chamber, a variable valve mechanism which can change the phases of the intake and exhaust valves, a turbine mounted in an exhaust passage of the engine and rotated with exhaust gases, a compressor mounted in an intake passage of the engine and rotated with a rotational force of the turbine, a bypass passage for bypassing the turbine, and a control valve for regulating the flow rate of exhaust gases flowing into the bypass passage. In this engine, the above-described objects are accomplished by controlling so as to scavenge exhaust gases from inside the combustion chamber by the use of at least one of the intake pipe pressure, combustion chamber pressure, and exhaust pipe pressure, and by injecting the fuel twice during intake stroke to compression stroke.

In other inventions, the objects are accomplished by conducting a control to decrease the function smoke number (FNS) to 0.5 or lower until the Indicated Mean Effective Pressure (an explosion pressure P of mega-pascal generated in the combustion chamber divided by the cubic meters of volume V of the combustion chamber) becomes approximately 9.5 bars when the engine torque is increased at a constant engine speed.

Furthermore, the objects are also accomplished by controlling the specific fuel consumption at a high load at which the Indicated Mean Effective Pressure will be 12 bars, to ±5% as compared with the specific fuel consumption at a medium load at which the Indicated Mean Effective Pressure will be 8 bars.

DESCRIPTION OF THE PREFERRED EMBODIMENTS

Preferred embodiments embodying this invention to an automotive gasoline engine system will be explained with reference to the accompanying drawings.

Figure 1:
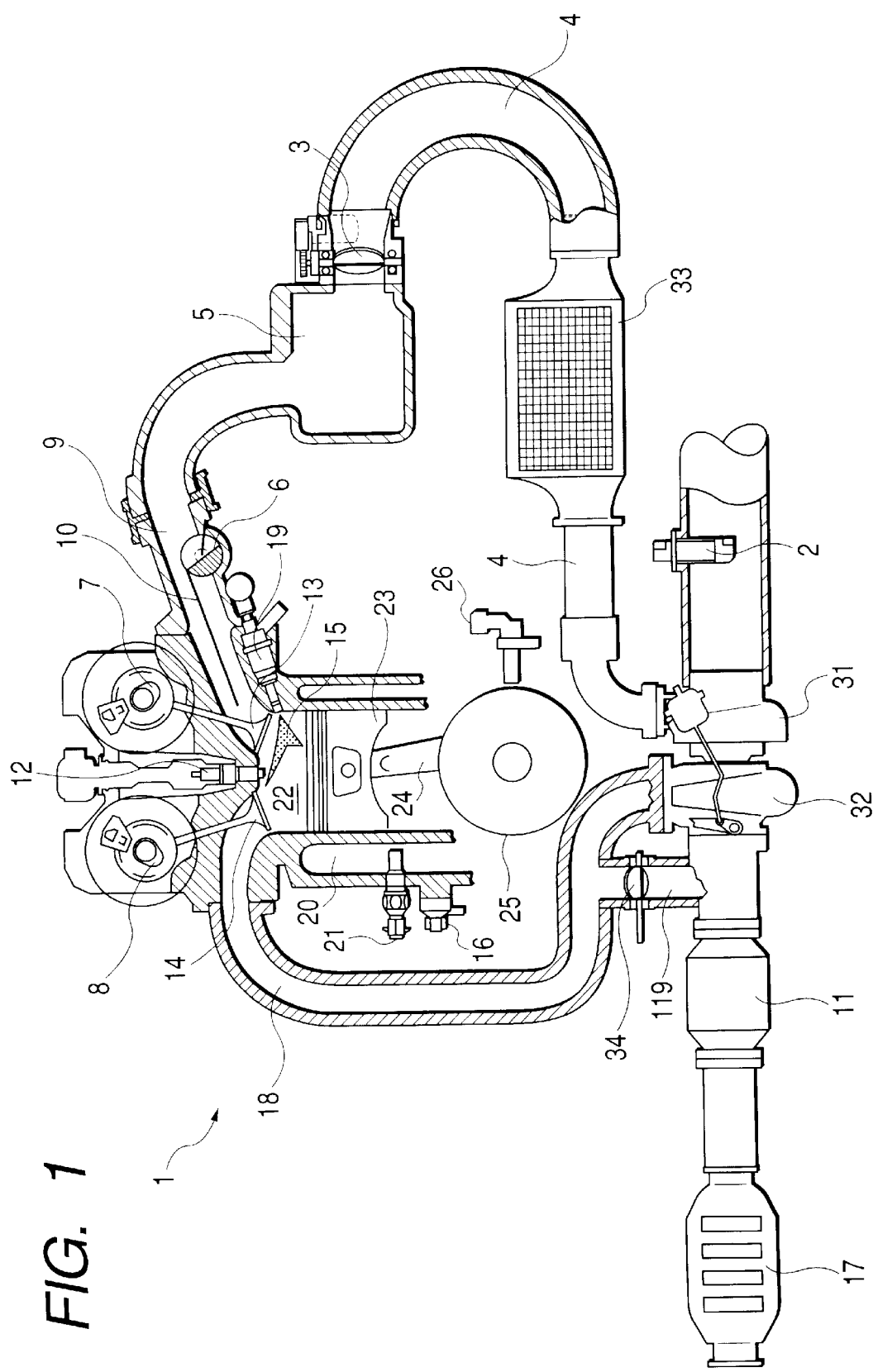
FIG. 1 is a system drawing of a direct-injection engine using this invention.

A gasoline engine system 1 shown in FIG. 1 is provided with an intake system for drawing the air into the engine, an exhaust system for discharging exhaust gases from the engine, and a turbocharger mounted in the piping of the intake and exhaust systems.

The intake system is provided with an air flow rate sensor 2 for measuring the quantity of air introduced from an unillustrated air cleaner, a compressor 31 which compresses the air thus introduced and delivers the compressed air, an intake air passage 4 connecting the compressor 31 and a throttle valve 3, an intake manifold 9 for distributing into each cylinder the air that has passed through the throttle valve 3, and a collector 5 for controlling intake pulsation between the intake manifold 9 and the throttle valve 3. The intake air compressed at the compressor 31 rises in temperature. Normally, therefore, an intercooler 33 is inserted on the way of the intake air passage 4 to thereby lower the intake air temperature.

The engine is of a direct-injection type having a fuel injector 19 for injecting fuel 15 directly into the combustion chamber 22, a piston 23, an intake valve 13, an exhaust valve 14, a spark plug 12, a variable mechanism 7 of the intake valve, a variable mechanism 8 of the exhaust valve, a water temperature sensor 21, a knocking sensor 16, a crank mechanism 24, and crank angle sensors 25 and 26. Furthermore, in a connection with the intake system are mounted a control valve 6 for producing a tumble air flow in the combustion chamber 22, and an air flow regulating plate 10.

In the exhaust system are mounted a turbine 32 connected to an exhaust passage 18 from the engine, the catalyser 11 located relatively close to the engine downstream thereof, and a catalyser 17 located near the underside of the vehicle floor. Furthermore, mounted on the way of the exhaust passage 18 is a control valve 34 which can change a cross section area of the flow path in a bypass passage 119 bypassing from the upstream side to the downstream side of the turbine 32.

The rough outline of engine operation will be described below. As the piston 23 connected to the engine crank mechanism 24 moves up and down, the combustion chamber 22 varies in volume. With the up-and-down movement of the piston 23, the air is drawn into the engine, then forcing out burned gases. The quantity of air to be drawn into the engine is controlled by the throttle valve 3 disposed in the intake passage 4. It should be noticed that the throttle valve 3 may be an electronically controlled throttle valve which is driven by a motor in accordance with an electric signal based on the depth of depression of the accelerator pedal. The quantity of air to be drawn into the engine is metered by the air flow rate sensor 2 located upstream of the throttle valve. The air thus drawn in is filled in the collector 5. The collector 5 is effective to restrain pressure fluctuations in the intake manifold 9. An EGR passage described later is in some cases connected to the collector 5. The intake air is taken in while producing an air flow in the combustion chamber 22, through the operation of the tumble air flow control valve 6.

The fuel is supplied to the fuel injector 19 after increasing a fuel pressure to a preset value by an unillustrated fuel pump. The quantity of fuel injected through the fuel injector 19 is measured by the air flow rate sensor 2, and on the basis of the measured value the width of injection pulse is computed to achieve a preset air-fuel ratio in the unillustrated control unit. The fuel injector 19 injects the fuel in accordance with an injection signal from the control unit.

The engine speed can be measured by the use of, for example, the output signals of the crank angle sensor 25 and a magnetic pickup 26 mounted on the crankshaft 24.

The exhaust gases discharged out of the combustion chamber 22 are led into the turbine 32 located on the way of the exhaust passage 18, turning the high-temperature energy into the rotation of the turbine and then being discharged. The compressor 31 connected with the turbine can increase the speed with the energy the turbine 32 has received, and compresses the newly introduced fresh air, then sending the compressed fresh air into the engine. The exhaust gases discharged out of the turbine 32 flow through the catalyser 11 mounted in the exhaust system. At this time, hazardous components in the exhaust gases (e.g., HC, NOx, and CO) are removed. The catalyser 17 is sometimes added to remove components which could not have been removed by the catalyser 11. Before and after the catalysers 11 and 17 may be mounted an unillustrated air-fuel ratio sensor, an exhaust temperature sensor, and an oxygen sensor, which will serve to capture various kinds of information about the exhaust gases, so that the information will be reflected to the control unit operation.

Figure 2:
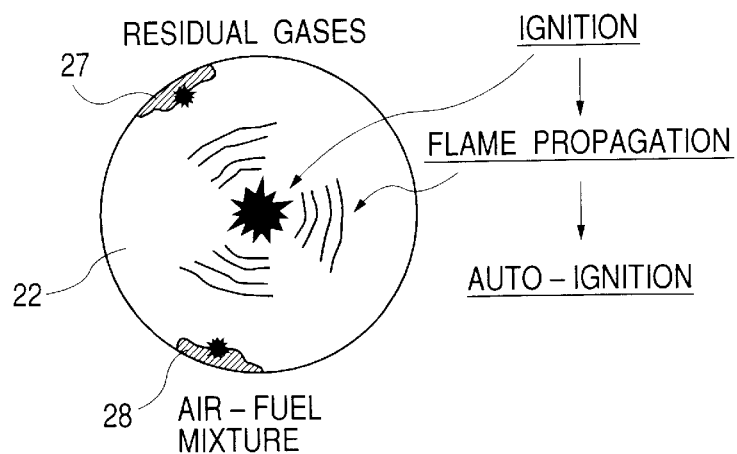
FIG. 2 is a view explaining the principle of knocking occurrence in this invention.

FIG. 2 is a schematic view of the estimated state in the combustion chamber 22 during high-load operation of the engine, showing a behavior such as the ignition of the air-fuel mixture in the combustion chamber 22, combustion starting at the center of the combustion chamber, and flame propagation around the combustion chamber. At this time, there still remain, around the combustion chamber, the exhaust gases of the preceding cycle, so-called residual gases 27, and a non-uniform portion 28 of air-fuel mixture distribution. The inside portion of the propagating flames is an already burned portion. In this inside portion, temperature and pressure are high, compressing an unburned portion in which residual gases 27 and non-uniform portions 28 of the air-fuel mixture exist is compressed through the flame surface. As a result, it is conceivable that the temperature and pressure of the residual gases 27 and the air-fuel mixture of the nonuniform portion 28 suddenly rise, resulting in self-ignition which will induce knocking. To prevent knocking, it is necessary to reduce the residual gases and further to uniformly spray the air-fuel mixture around the combustion chamber (in the vicinity of the cylinder wall).

In the direct-injection engine of the configuration shown in FIG. 1, important is to reduce the residual gases by accelerating exhaust gas scavenging from inside the combustion chamber 22 during high-load operation, and also to prevent uneven presence of the air-fuel mixture around the combustion chamber (in the vicinity of the cylinder wall). A means required for this purpose will be described below.

Figure 3:
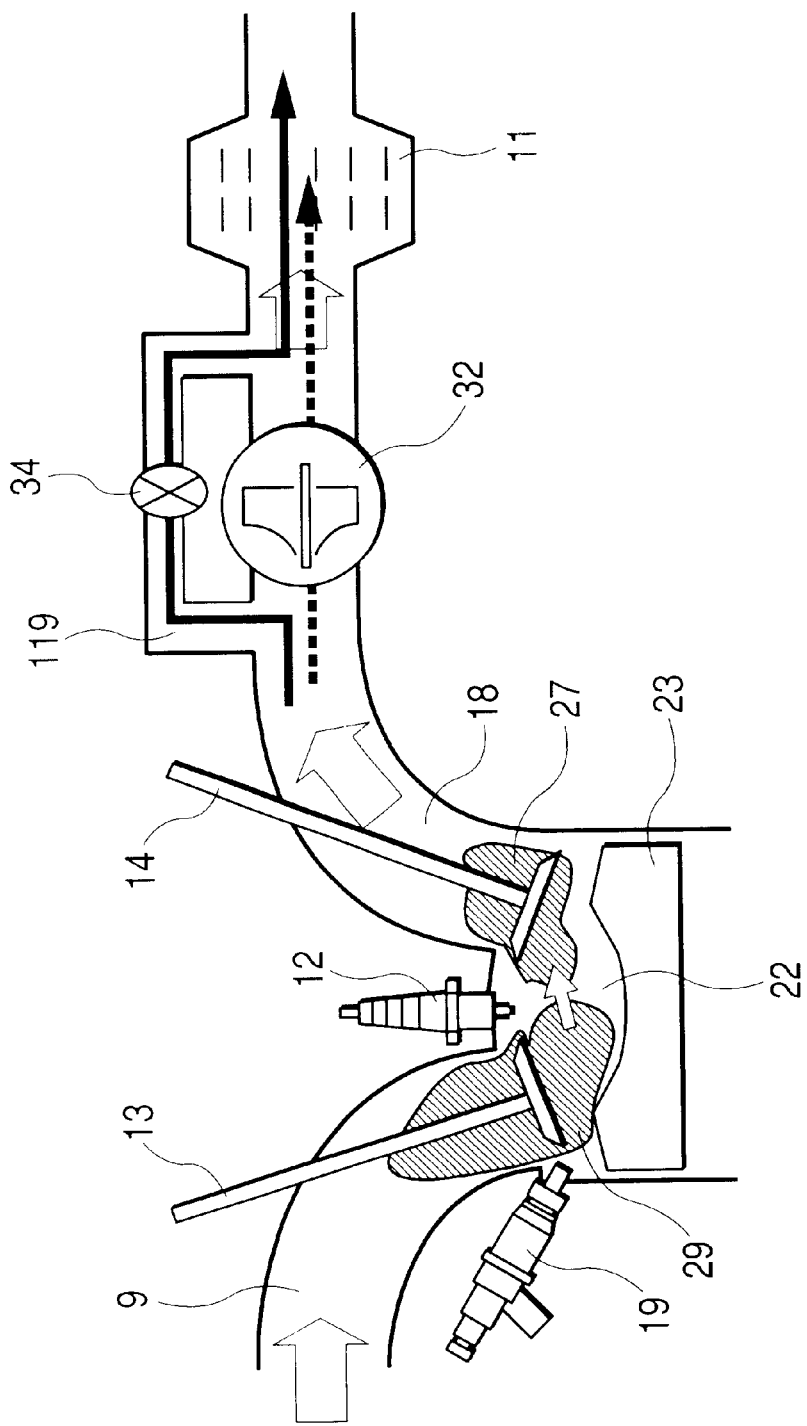
FIG. 3 is a view explaining a method in this invention for scavenging residual gases.

FIG. 3 is a schematic view showing the engine combustion chamber and the exhaust gas passage in cross section. In this drawing, most of the intake system shown in FIG. 1 is not shown; the air 29 is led from the intake port 9 into the combustion chamber 22. In the timing from the end of almost the entire exhaust stroke to the beginning of the intake stroke, the piston 23 is in a position near TDC, where the intake valve 13 and the exhaust valve 14 are slightly opened. Most of the exhaust gases are discharged in the exhaust stroke, but the slightly remaining portion 27 becomes residual gases. One of key points of this invention is to accelerate the scavenging of the exhaust gases 27. A concept therefor is to blow off the exhaust gases 27 by the use of the fresh air 29 newly drawn in. The piston 23, as shown in FIG. 3, is in a position close to TDC, at which the space in the combustion chamber 22 is narrow and therefore it is possible to discharge the exhaust gases 27 by the use of the fresh air 29 drawn in through the intake valve. This state, however, is established only when the pressure in the intake passage 9 is higher than the pressure in the exhaust passage 18. Therefore, the scavenging of the exhaust gases 27 can be accelerated by forming the above-described state.

Figure 4:
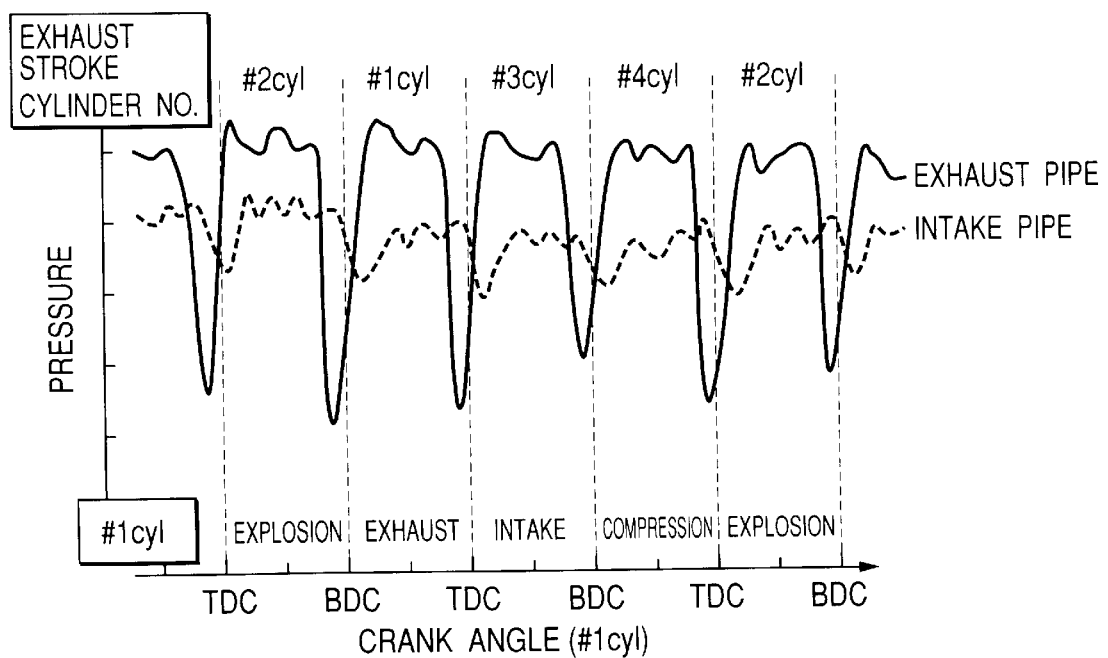
FIG. 4 is a view showing pressure variations in intake and exhaust pipes.

FIG. 4 shows a result of measurements of pressure changes in the intake passage 9 and exhaust passage 18 of the engine shown in FIG. 3. The engine measured is a four-cylinder engine. In FIG. 4, the horizontal axis shows the pressure changes based on the crank angle of No. 1 cylinder. Furthermore, in the upper part of the drawing are indicated the cylinder numbers in the exhaust stroke. The pressure in the exhaust passage 18, affected by pulsation between cylinders, is largely varied as shown. With the start of the exhaust stroke of No. 1 cylinder, the high-pressure exhaust gases are discharged out of the combustion chamber of No. 1 cylinder, increasing the pressure of the exhaust pipe 18. During the exhaust stroke, a relatively high pressure is kept; and at the end of the exhaust stroke, the pressure lowers. However, since the exhaust stroke in No. 3 cylinder starts, the pressure in the exhaust pipe 18 increases. On the other hand, the pressure in the intake pipe 9 also varies with the effect of pulsation between cylinders. An average value is lower than the pressure in the exhaust pipe 18. In this state, the intake pipe pressure increases greater than the exhaust pipe pressure only during a little timing immediately before the end of the exhaust stroke. It is, therefore, impossible to effectively discharge the exhaust gases with the fresh air.

Figure 5:
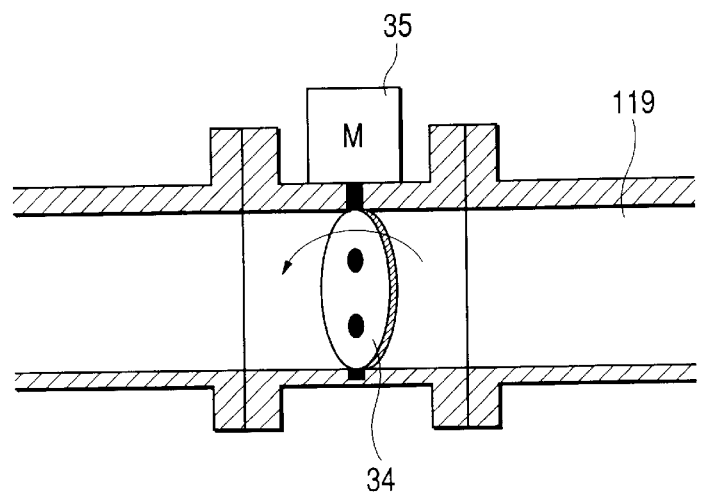
FIG. 5 is a view showing one example of a bypass control valve.
Figure 6:
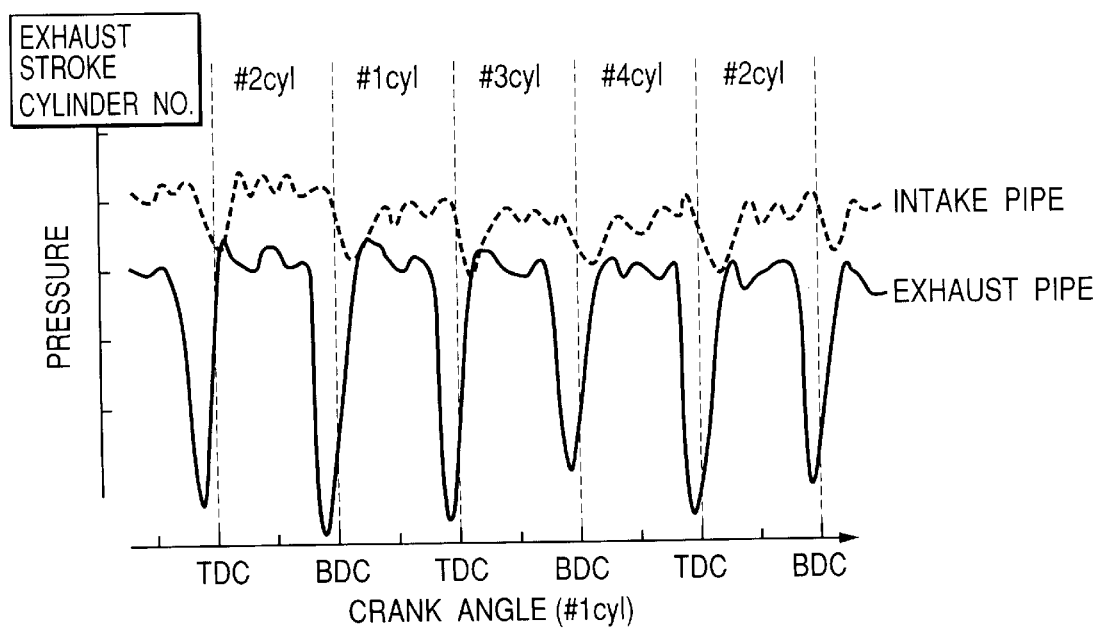
FIG. 6 is a view showing pressure variations in the intake and exhaust pipes when the bypass control valve is used.

In this invention, as shown in FIG. 3, the control valve 34 is inserted in a bypass passage 119 of the turbine 32. The bypass control valve 34 is of the construction as shown, for example, in FIG. 5, being turned by the motor 35. As the control valve 34 is turned, an opening portion is made between the bypass passage and the control valve, to allow the flow of the exhaust gases to bypass the turbine 32, thereby decreasing the pressure in the exhaust passage 18. A result of measurement of pressure changes in the exhaust pipe 18 is shown in FIG. 6. The pressure in the exhaust pipe 18 can be decreased lower than that in the intake pipe 9; that is, the intake pipe pressure becomes greater than the exhaust pipe pressure, enabling to effectively discharge the exhaust gases with the fresh air.

Figure 7A:
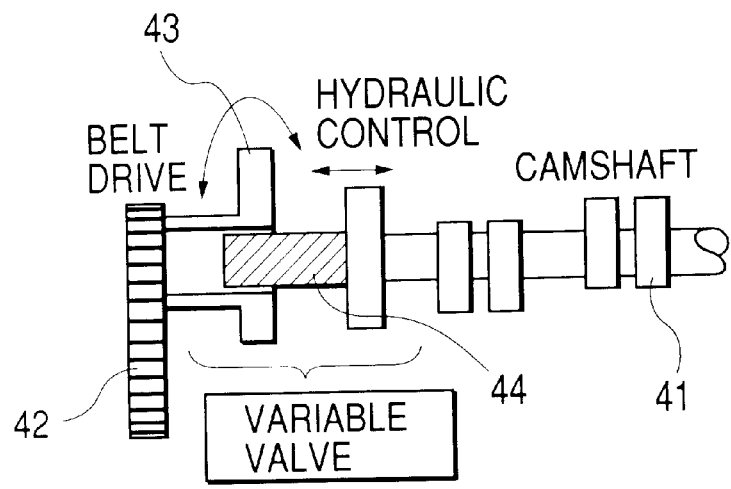
FIG. 7 is a view showing one example of a phase-type variable valve mechanism.
Figure 7B:
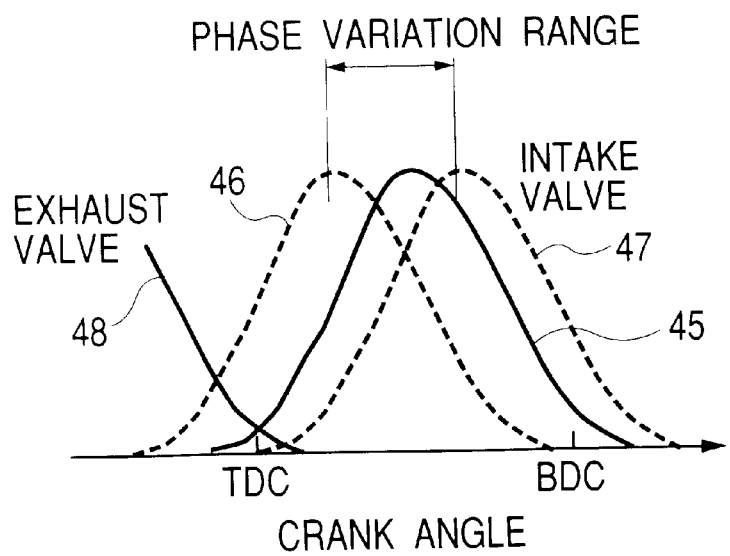
Figure 8:
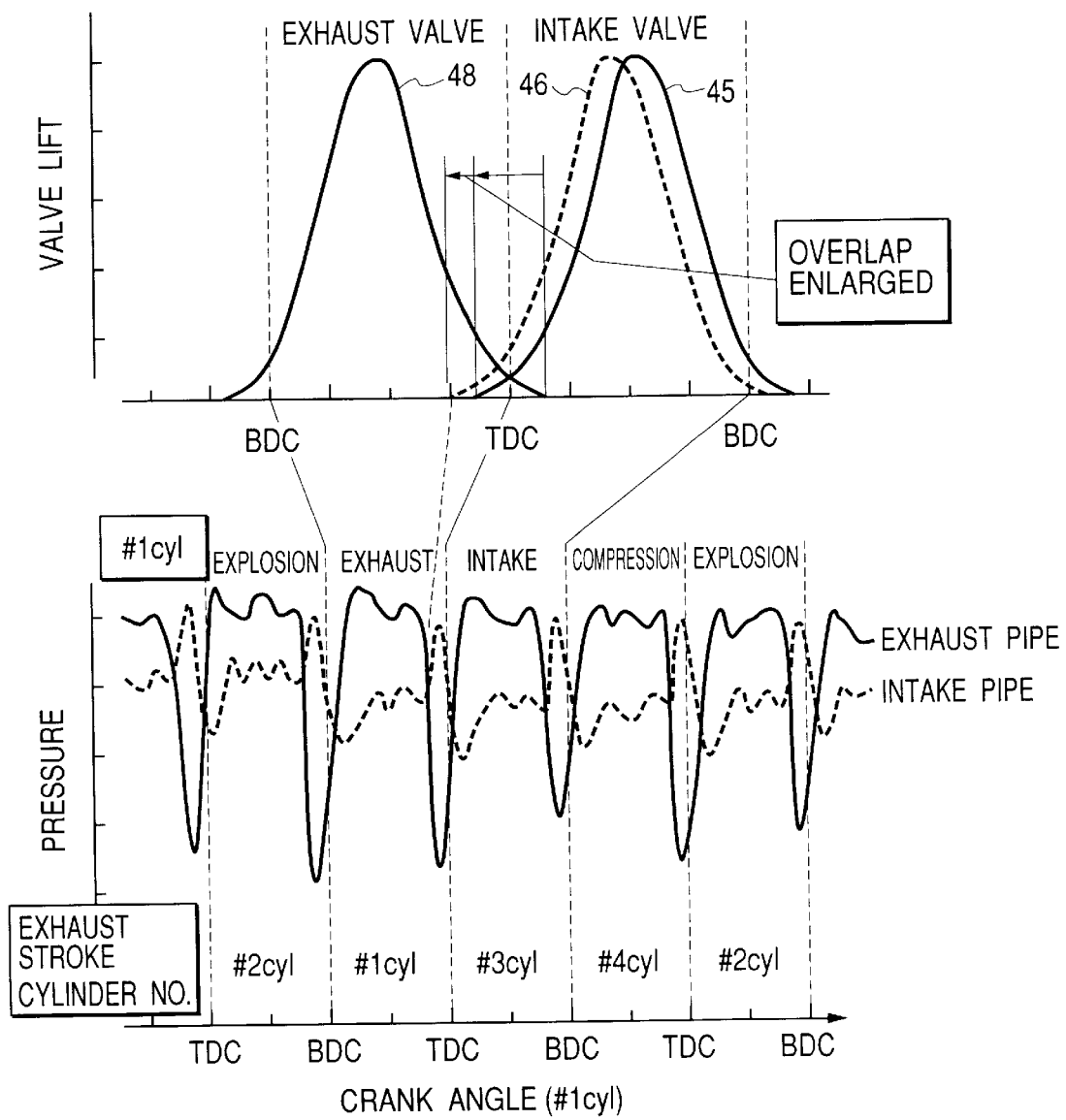
FIG. 8 is a view showing pressure variations in the intake and exhaust pipes when the intake valve timing is advanced.

Next, another method of scavenging in this invention will be described. The intake valve 13 shown in FIG. 1 or the variable mechanisms 7 and 8 of the exhaust valve 14 are of the construction as shown in FIG. 7A. A variable valve mechanism 44 is interposed between a camshaft 41 and a cam sprocket 43 on which a timing belt 42 is wound, shifting the phase of rotation of the camshaft 41 and the timing belt 42 by moving the screw portion of the variable valve mechanism 44 by, for instance, hydraulic pressure control. FIG. 7B shows the effect of, for example, the variable mechanism of the intake valve. The exhaust valve lift curve 48 indicates that the exhaust valve closes at timing a little after top dead center (TDC in the drawing). The intake valve lift curve 45 is set at a standard timing, at which the intake valve opens a little before TDC and closes a little after bottom dead center (BDC in the drawing). When the phase is advanced, the lift curve will move as indicated by the curve 46, thus shifting the intake valve opening timing substantially forward from TDC. On the other hand the valve closing timing also shifts forward to the vicinity of BDC. Reversely, when the phase is retarded, the intake valve lift curve will come to 47, where the intake valve starts opening near TDC and closes at a timing considerably after BDC. The valve opening timing of the intake valve 13 can be changed by using the variable valve mechanism as shown in FIG. 7A; FIG. 8 shows a method of controlling an overlap period by the use of the variable valve mechanism.

Figure 9:
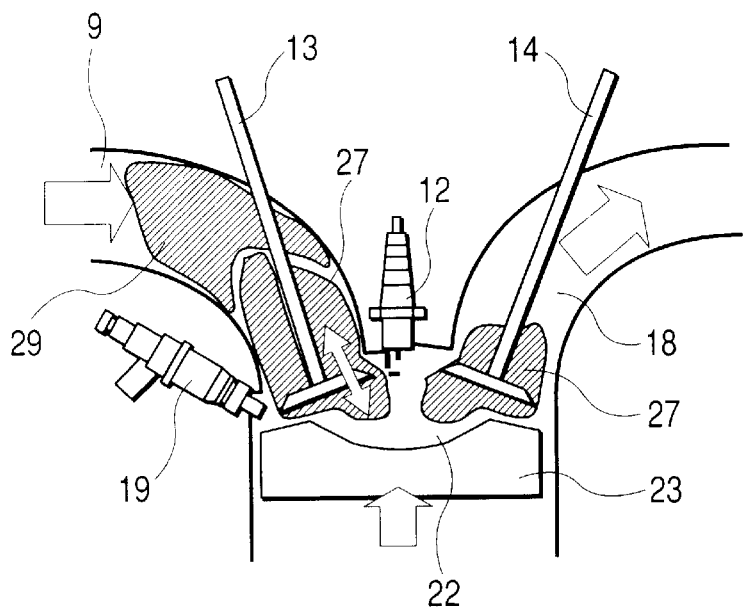
FIG. 9 is a schematic view showing the interior of the combustion chamber when the intake valve timing is advanced.

The intake and exhaust valves of No. 1 cylinder will be explained as an example. When the lift curve of the intake valve 13 is changed from 45 to 46 without changing the lift curve 48 of the exhaust valve 14, the overlap period during which both the exhaust valve 14 and the intake valve 13 are open increases to the exhaust stroke side as indicated by an arrow. During the exhaust stroke of No. 1 cylinder, the piston 23 is forcing the exhaust gases out into the exhaust passage 18; and the intake valve 13 starts opening and the exhaust gases flow toward the intake passage 9 where a lower pressure exists. Thus the exhaust pressure decreases, while the intake pressure increases. At this time, the state that the intake pipe pressure>the exhaust pipe pressure is established. In this case, however, the gas flow around the combustion chamber is thought to be as shown in FIG. 9. Because the intake valve 13 opens on the way of the exhaust stroke, the exhaust gases 27 partly flow back toward the intake passage 9, disturbing the inflow of the fresh air 29. At the next instant, there will be established the pressure condition that the intake pipe pressure>the exhaust pipe pressure; therefore the exhaust gases begin flowing in the direction of the arrow in the drawing. However, because the exhaust gases 27 that have flowed back come in first from the intake passage 9, the exhaust gases are drawn again into the combustion chamber 22, thus forming the residual gases. Therefore, if the phase of the intake valve 13 is accelerated toward the exhaust stroke side, it will become impossible to accelerate the scavenging of the residual gases that is the key point of this invention.

Figure 11:
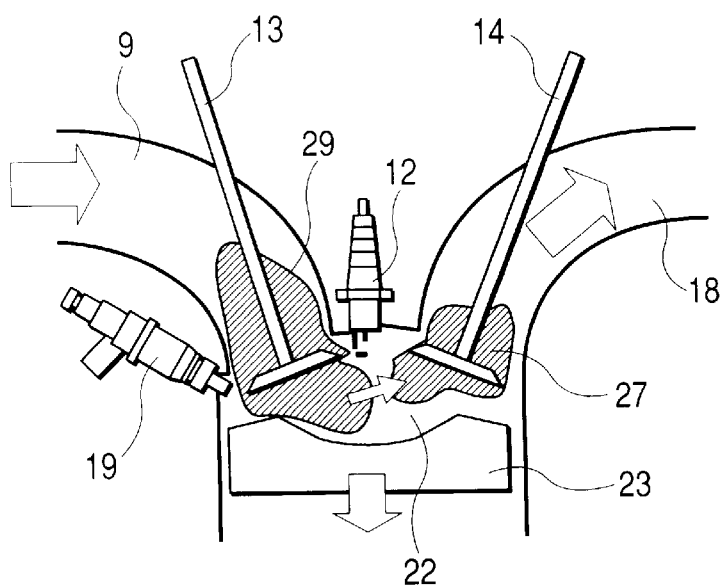
FIG. 11 is a schematic view showing the interior of the combustion chamber when the exhaust valve is retarded.
Figure 10:
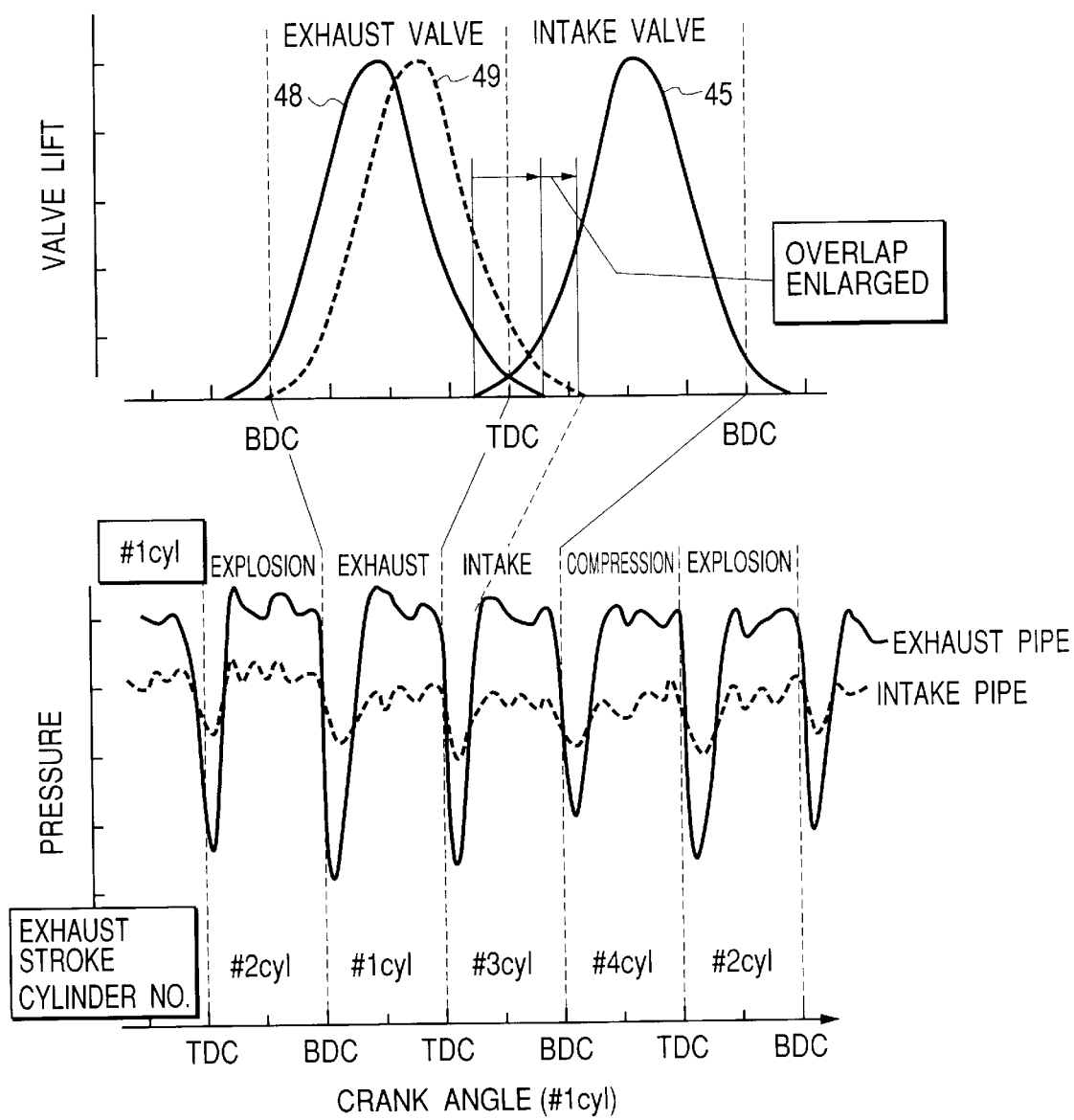
FIG. 10 is a view showing pressure changes in the intake and exhaust pipes when the exhaust valve timing is retarded.

The variable valve mechanism shown in FIG. 7 is applicable also to the exhaust valve 14. The phase of the exhaust valve 14 retarded to the intake stroke side is shown in FIG. 10. The lift curve of the exhaust valve 14 is changed from 48 to 49 without changing the lift curve 45 of the intake valve 13. According to this setting, the exhaust valve 14 starts opening in the vicinity of BDC, and closes considerably after TDC. Therefore, the fresh air drawn after the start of downward stroke of the piston is higher than the exhaust gas in pressure, thereby a slight amount of residual exhaust gases which exist in combustion chamber are enable to effectively scavenge. The behavior of the interior of the combustion chamber 22 at this time can be schematically expressed as shown in FIG. 11. Since the exhaust valve 14 remains open until after TDC, it is considered that the exhaust gases 27 are forced out by the fresh air 29 drawn in through the intake passage 9, thus fully scavenging.

Figure 12:
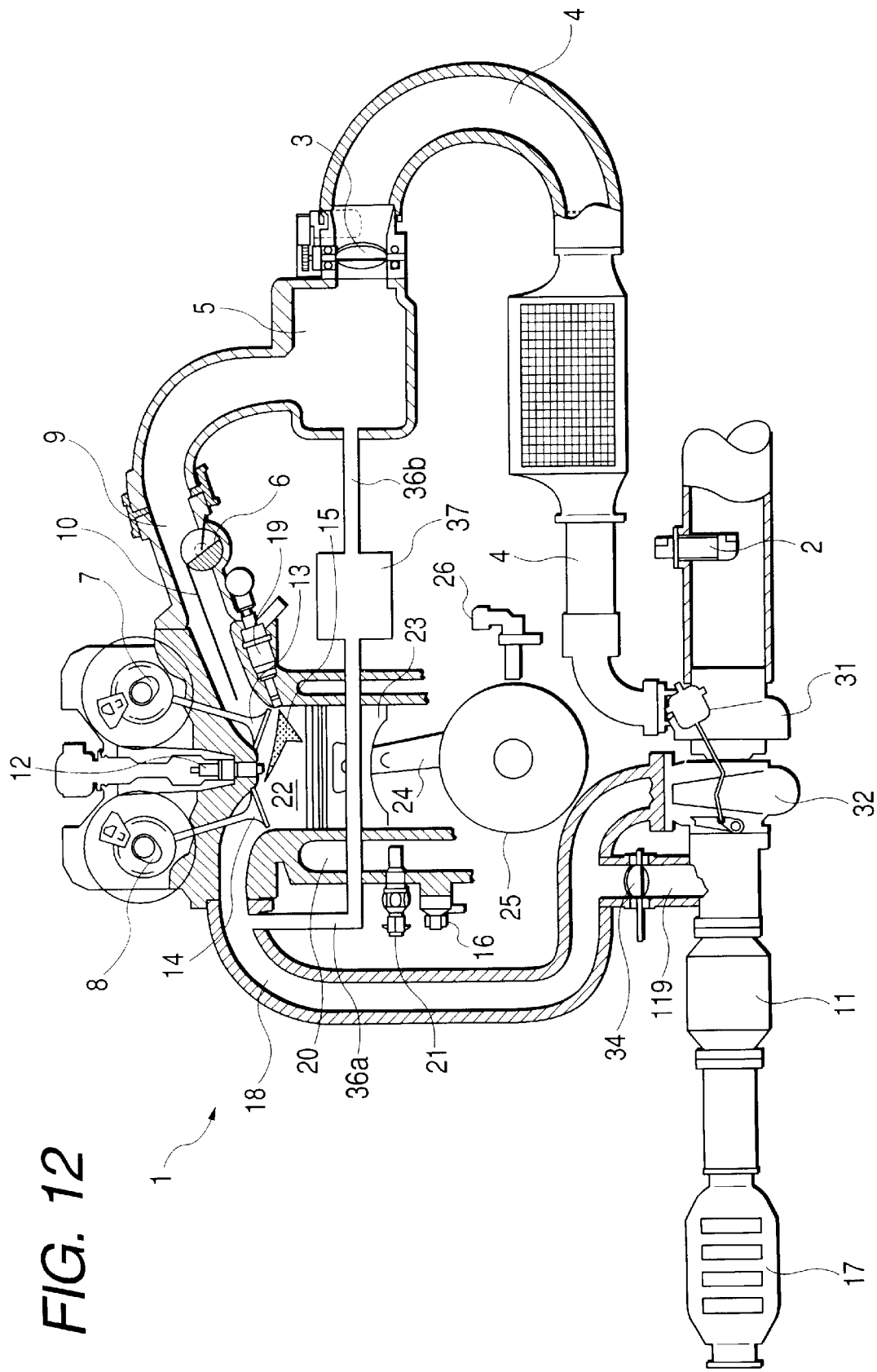
FIG. 12 is a system view of the direct-injection engine equipped with an exterior EGR system.
Figure 13:
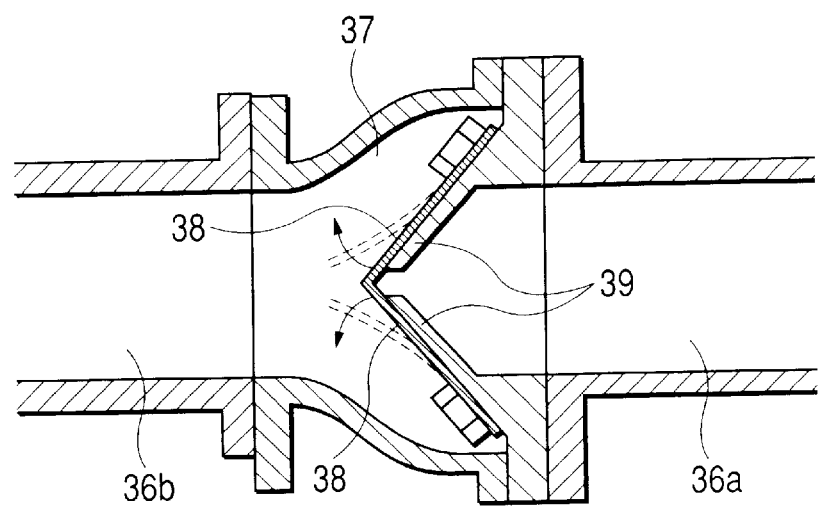
FIG. 13 is a view showing one example of the EGR control valve.

Another embodiment of this invention will be explained by the use of the engine system having an external EGR (Exhaust Gas Recirculation) passage. FIG. 12 shows the configuration of the engine system provided with an external EGR passage 36 and an EGR control valve 37. The engine, when operating under a high-load condition, is supercharged by the turbocharger; therefore the pressure of the collector 5 mounted in the intake pipe will sometimes increase more than the pressure in the exhaust pipe 18. Only the connection of the EGR passage 36 cannot effectively operate the EGR to recirculate the exhaust gases from the exhaust side to the intake side. Therefore, the EGR control valve as shown in FIG. 13 is used. The EGR passage 36a is in connection with the exhaust passage 18, while 36b is in connection with the collector 5 on the intake side. The configuration of the EGR control valve 37 is that of a reed valve. When the intake pressure is higher than the exhaust pressure, the reed valve 38 is firmly attached on a mounting holder 39 and is in a closed position. On the other hand, when the exhaust pressure is higher than the intake pressure, the reed valve 38 opens to allow the exhaust gases to flow into the intake side, thereby enabling EGR. The reed valve-type EGR control valve is able to operate without requiring an external mechanism power. Furthermore since the reed valve operates in accordance with pressure pulsation in the exhaust pipe as shown in FIG. 4, the exhaust pipe pressure can consequently be changed as shown in FIG. 6, that is, can be lowered to effectively accelerate the scavenging of the combustion chamber interior.

Figure 14:
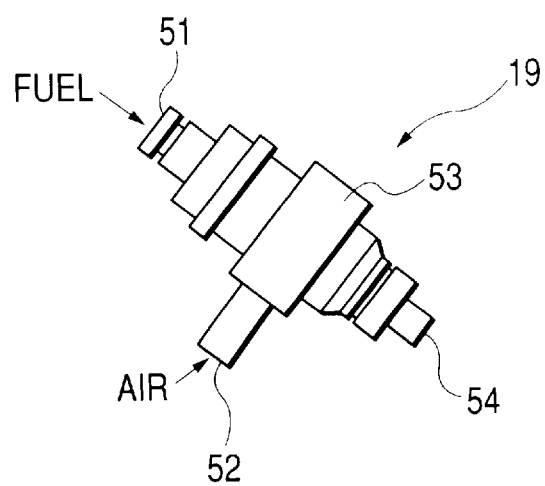
FIG. 14 is a view explaining the configuration of an air-assist injector.

Furthermore, another embodiment of this invention applied to an engine system provided with an air-assist fuel injector will be explained. FIG. 14 shows the configuration of the air-assist fuel injector. The fuel supplied through the air supply port 51 is temporarily held in a mixing chamber 53, in which the fuel is mixed with the air supplied through the air supply port 52, then being injected into the combustion chamber at the forward end portion 54 of the fuel injector. When the air-assist fuel injector is used, the air used for fuel injection is usable for scavenging the residual gases.

Figure 15:
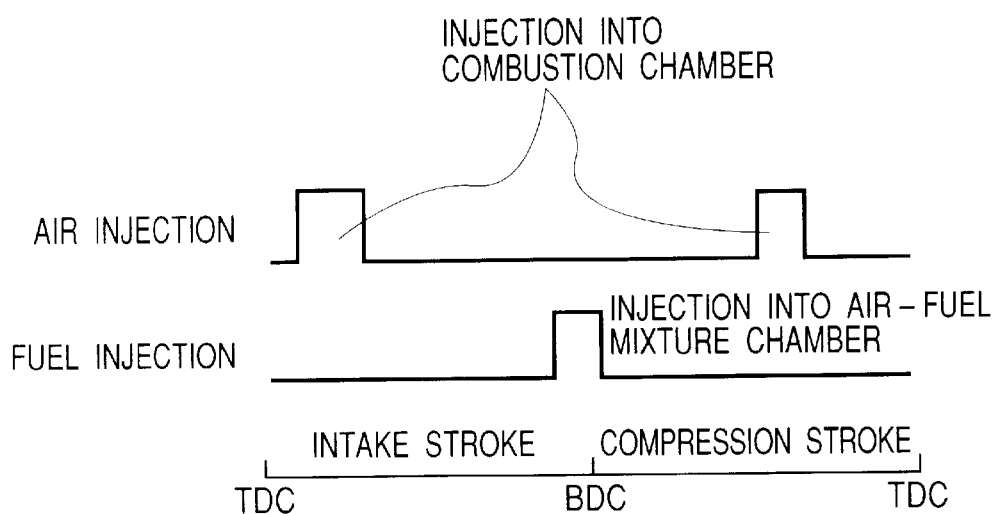
FIG. 15 is a view explaining injection control by means of the air-assist injector.
Figure 16:
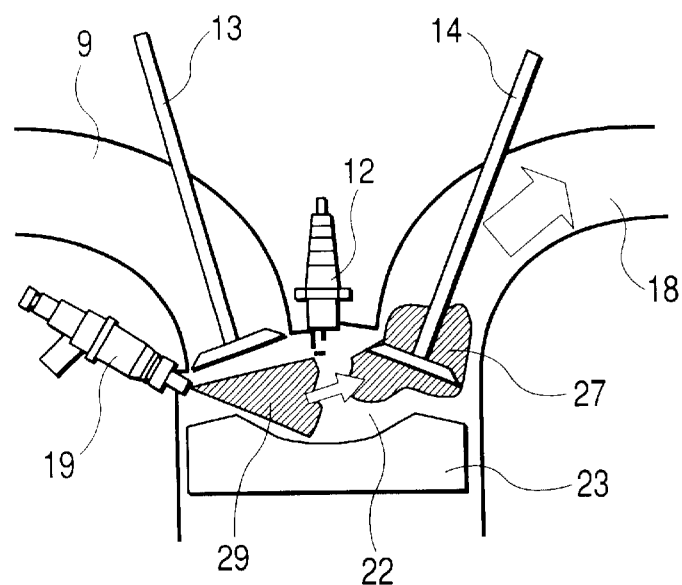
FIG. 16 is a schematic view showing the interior of the combustion chamber when the air-assist injector is used.

FIG. 15 shows a time chart thereof. During the timing when the exhaust valve is still open in the vicinity of TDC after the end of the exhaust stroke, only the air is injected first into the fuel chamber. The air injection pressure at this time, being about 0.6 to 0.5 MPa, has a sufficient effect to scavenge the exhaust gases of about 0.1 MPa. The behavior of the interior of the combustion chamber at this time is schematically shown in FIG. 16. Thereafter, according to the normal fuel injection system, that is, when the fuel is injected into the mixing chamber 53 at around BDC and then the air is injected into the mixing chamber 53 at any given timing in the compression stroke, the air is mixed with the fuel held in the mixing chamber 53, the air-fuel mixture being injected into the fuel chamber.

Figure 17:
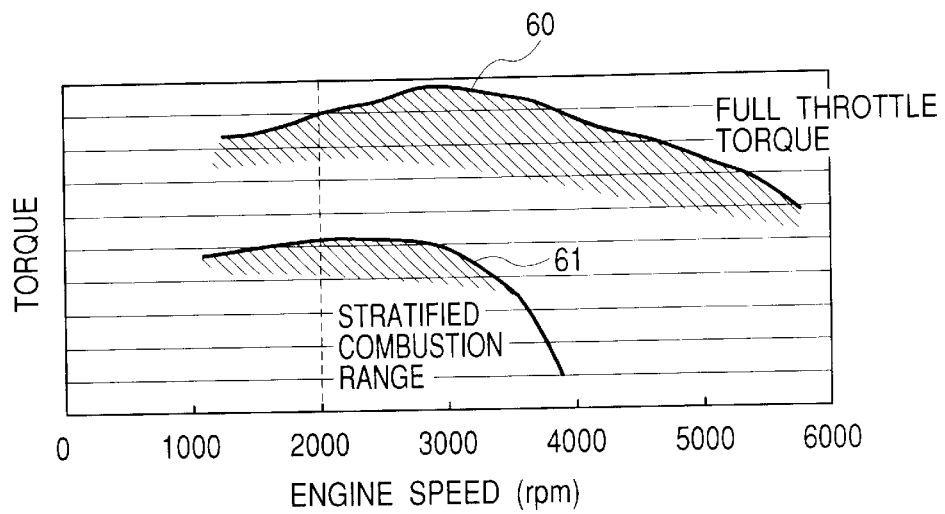
FIG. 17 is a view showing the scope of application of this invention.
Figure 18:
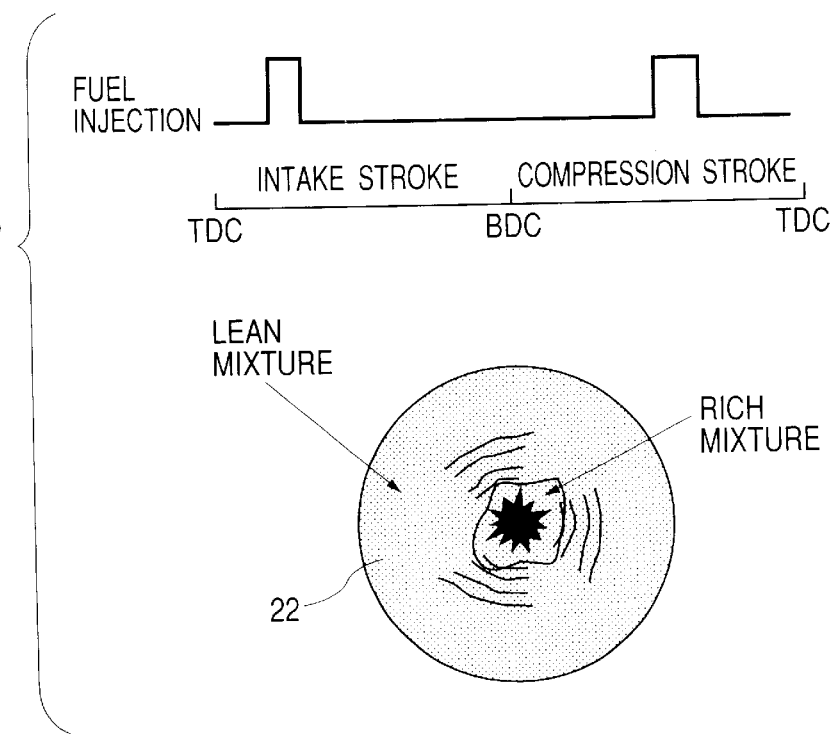
FIG. 18 is a view explaining the formation of air-fuel mixture injected twice.
Figure 19:
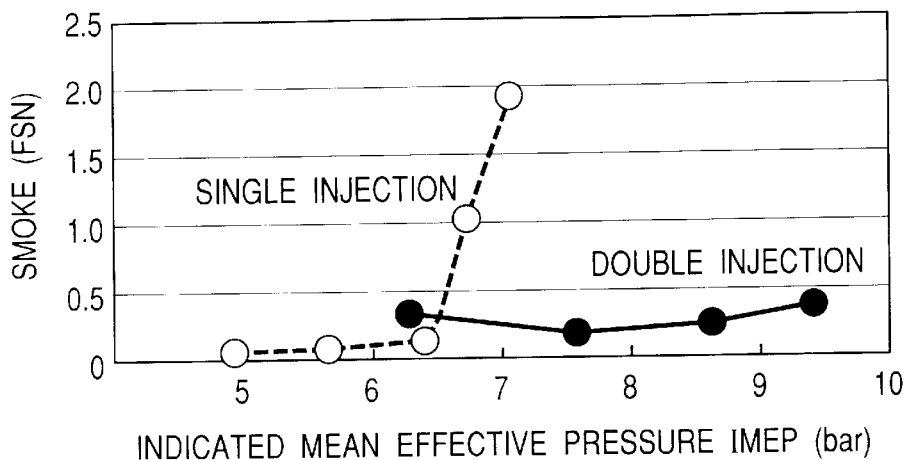
FIG. 19 is a view explaining the effect of twice injection at the time of homogeneous combustion.
Figure 22:
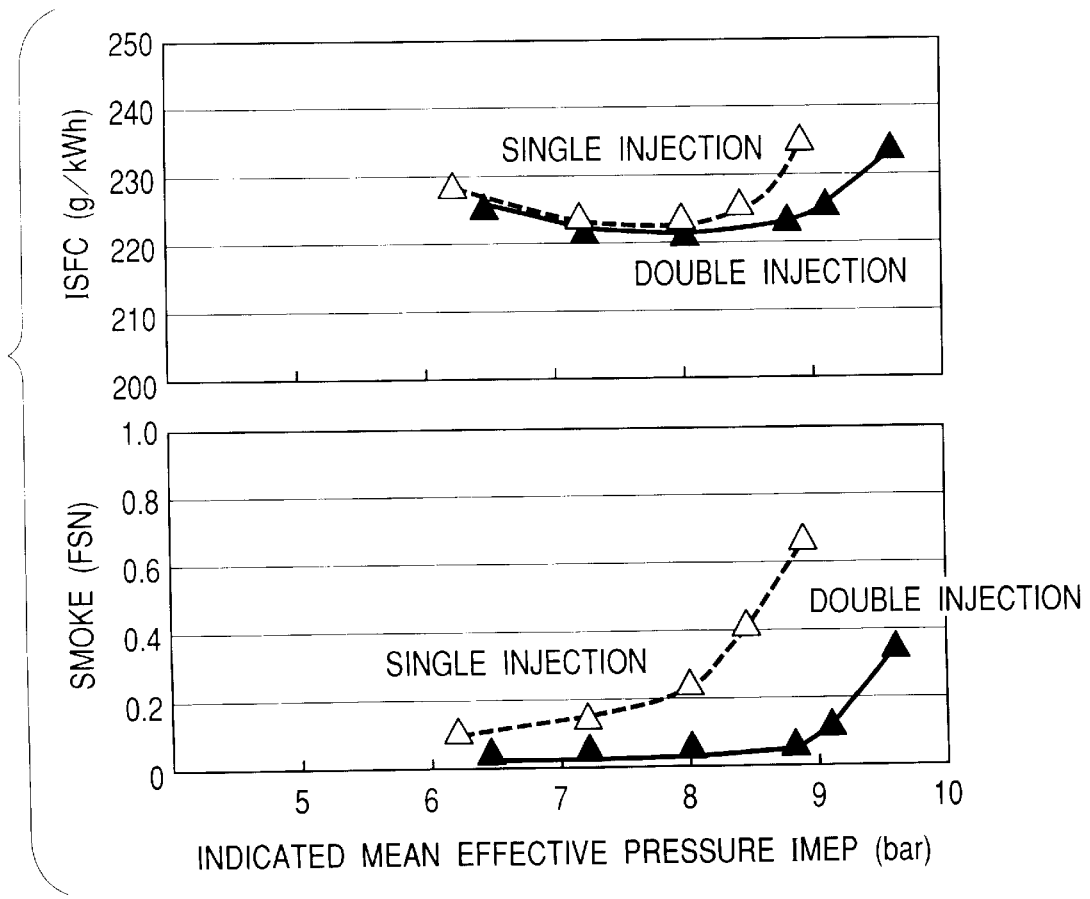
FIG. 22 is a view explaining the effect of proximity twice injection at the time of stratified combustion.

Next, the second key point of this invention, that is, the method of forming the air-fuel mixture according to which no air-fuel mixture is left around the combustion chamber (in the vicinity of the cylinder wall) will be explained. This invention, when expressed in terms of engine speed and torque as shown in FIG. 17, is effective in the range 60 where a full-throttle torque is obtained and also in the comparatively high-load range 61 in the stratified combustion range. In the range 60, a great torque is demanded, and therefore much fuel is injected into the combustion chamber. If much fuel is injected, the fuel will not be properly mixed with the air taken into the combustion changer, resulting in the formation of both the range of uniform mixture at an intended air-fuel ratio and the range of non-uniform mixture. In the range of non-uniform mixture, the air-fuel ratio is likely to increase or decrease; therefore there will easily occur spontaneous ignition (auto ignition), or knocking. To prevent this, therefore, injection is effected separately in the intake stroke and in the compression stroke as shown in FIG. 18. In this case, the amount of air-fuel mixture to be injected at a single is decreased. Thereby, in the intake stroke, the mixture of the fuel with the intake air is improved and formed a lean air-fuel mixture in the whole part of the combustion chamber. Thereafter, in the compression stroke, the remaining fuel is injected into the combustion chamber, thereby a rich air-fuel mixture is formed around a spark plug. In such a condition of air-fuel mixture, if flames propagate upon the ignition of a rich air-fuel mixture, no knocking will occur because there is no place where an excess amount of fuel (rich air-fuel mixture) is present around the combustion chamber (in the vicinity of the cylinder wall) and besides the residual gas scavenging which is one of key points of this invention is thoroughly performed. Also, in the case of once injection, the fuel is likely to hold on the top surface of the piston and the cylinder wall surface, resulting in uneven air-fuel mixture distribution which is considered to cause smoke to occur. FIG. 19 is a diagram showing a relationship between engine torque and smoke expressed in terms of an Indicated Mean Effective Pressure. This diagram shows a result of measurements of the amount of smoke coming out when the engine torque is increased at a constant engine speed. In the case of once injection, the amount of smoke suddenly increases from once the time IMEP (Indicated Mean Effective Pressure) passed about 6.5 bars. Furthermore, it is understood that the maximum torque is limited to about 7 bars because of the occurrence of knocking. In the meantime, in the case of a double injection, knocking hardly takes place. Therefore the effect of torque is largely improved by supercharging; and the maximum torque has been substantially improved to about 9.5 bars, showing no tendency to increase the smoke.

Figure 20:
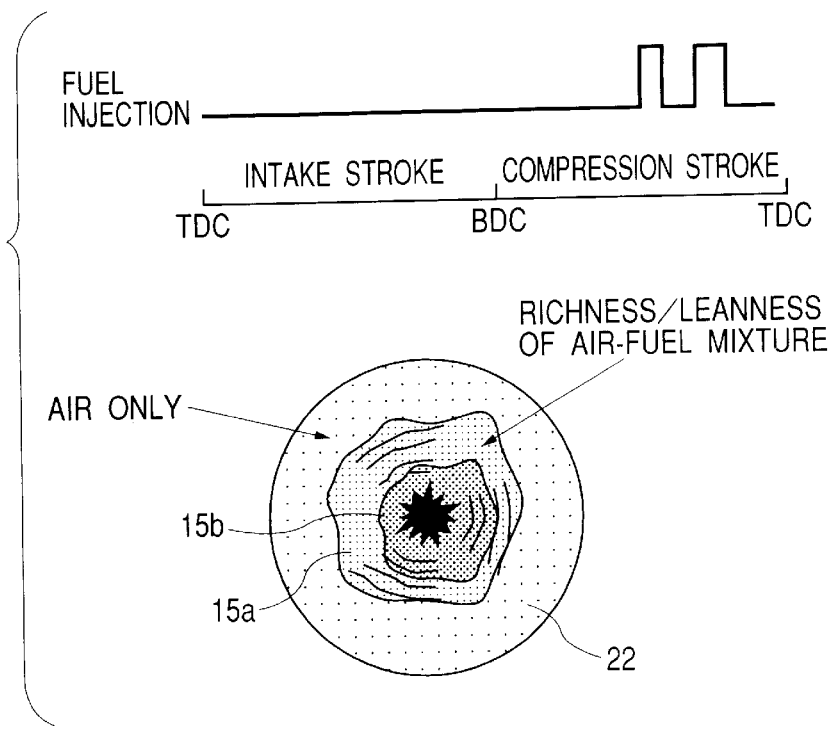
FIG. 20 is a view explaining the formation of air-fuel mixture by proximity twice injection.
Figure 21:
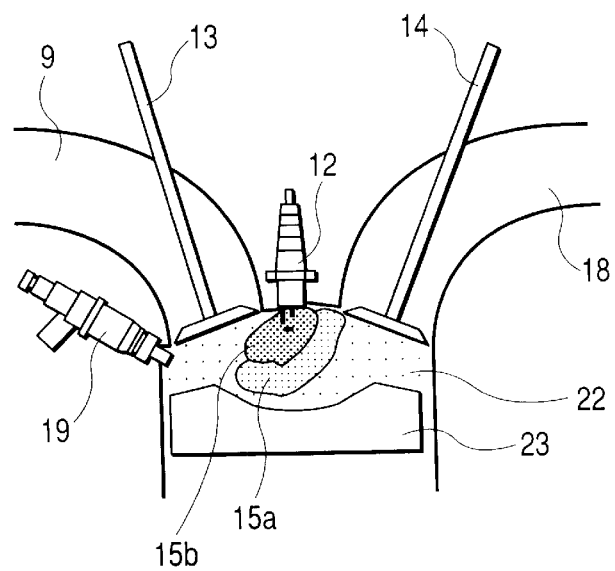
FIG. 21 is a view explaining the formation of air-fuel mixture by proximity double injection.

Next explained is the method of forming the air-fuel mixture that, in the range of relatively high load 61 in the stratified combustion range, the air-fuel mixture will not be unevenly distributed around the combustion chamber (in the vicinity of the cylinder wall). This range is the stratified combustion range; therefore, fuel injection is effected in the latter half of the compression stroke. However, because of a relatively high load in the stratified combustion range, the quantity of fuel injection increases; under such a condition, smoke is likely to come out. In this range, therefore, it is effective to perform twice injection (called the proximity twice injection) at a short interval during the latter half timing of the compression stroke. FIG. 20 schematically shows the state of the air-fuel mixture in the combustion chamber 22. Because of the stratified combustion, only the air is present in a large part of the interior of the combustion chamber 22, and the fuel is injected so as to gather around the spark plug in the latter half of the compression stroke. The fuel to be injected at the first time is injected when the combustion chamber pressure is relatively low, diffusing to the vicinity of the center of the combustion chamber to thereby form the air-fuel mixture 15a. At the second time injection, the combustion chamber pressure is higher than that at the first time injection. The fuel injected, therefore, will not diffuse wide in the combustion chamber, forming the air-fuel mixture 15b around the spark plug. FIG. 21 is a schematic view showing the engine combustion chamber as viewed sideways. The air-fuel mixture 15b, being guided by the airstream produced by the formation of the air-fuel mixture 15a, is borne to the vicinity of the spark plug 12. By thus forming the rich and lean portions of the air-fuel mixture at the central part of the combustion chamber, it is possible to prevent the uneven formation of the air-fuel mixture near the cylinder wall which becomes a factor of knocking, and also to restrain smoke occurrence thanks to better dispersion of the air-fuel mixture than that at the time of the single injection.

Figure 23:
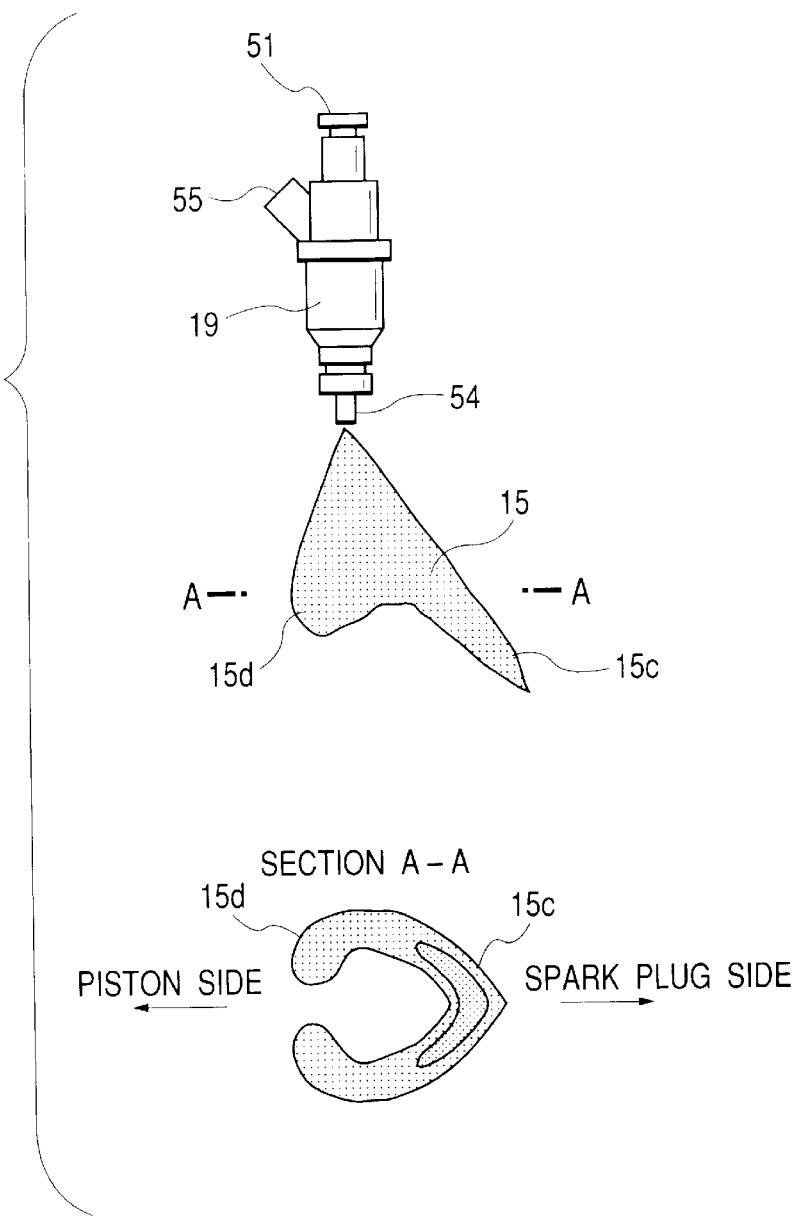
FIG. 23 is a view explaining a form of mists for realizing spray lead.

Furthermore, a method of forming a similar mechanism for producing the air-fuel mixture through another technique will be explained. FIG. 23 shows the form of fuel spray 15 injected from the fuel injector 19. Although not illustrated, the pressurized fuel is supplied into the fuel supply port 51 of the fuel injector; and when the valve opening signal is applied to a connector 55, the fuel spray 15 is formed by the shape of the forward end of a nozzle 54 of the fuel injector 19. The form of fuel spray features a high penetration like the spray 15c, or a long penetration component, and a little short penetration component on the opposite side. It is understood from the section A—A that a part of the spray 15d is partly broken, and the spray 15c portion has a high spray concentration. It has been confirmed that when the fuel injector having such a feature is installed to the engine, combustion performance can be improved by directing the spray component 15c toward the spark plug.

Figure 24:
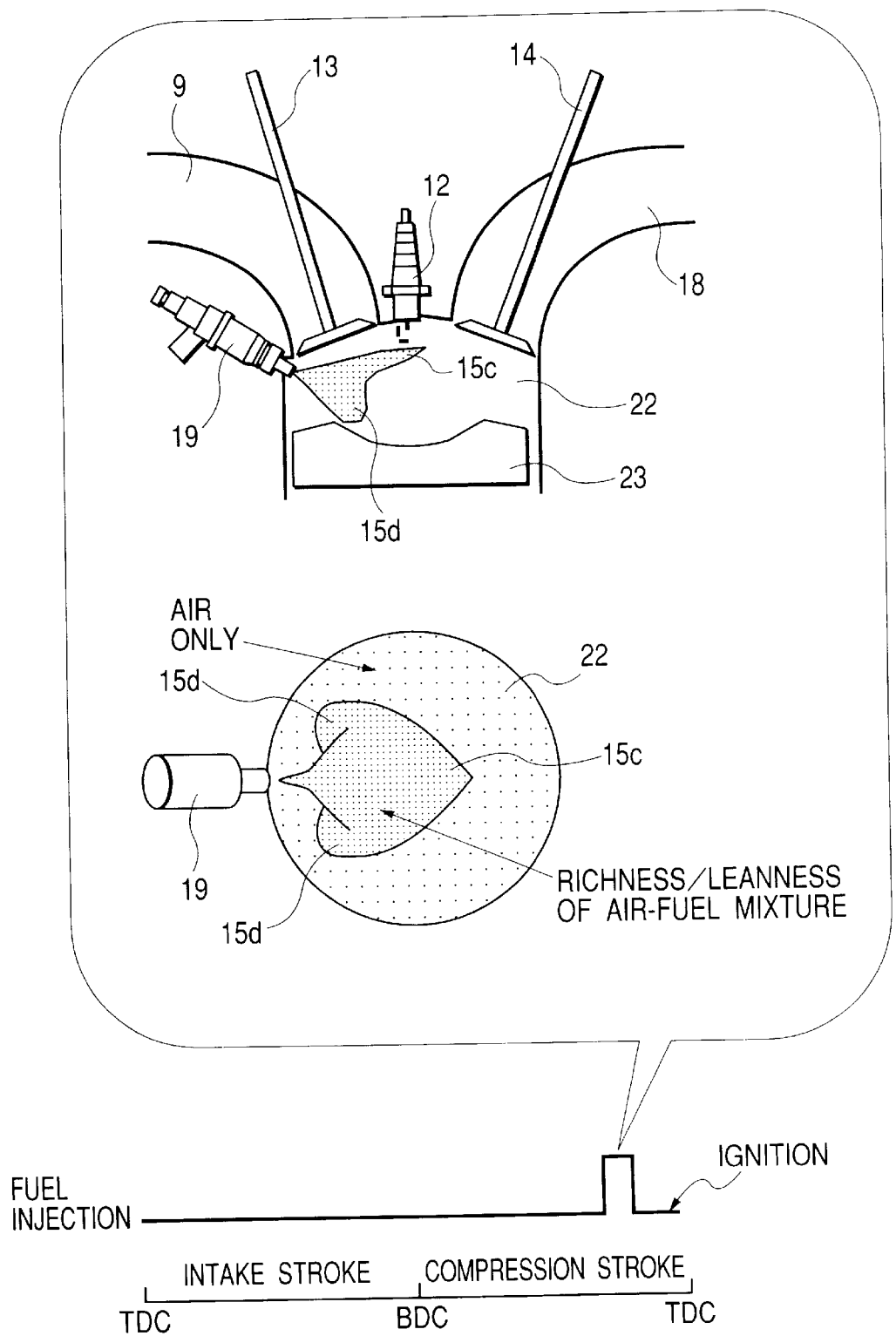
FIG. 24 is a view explaining the spray lead.

The process for forming the air-fuel mixture at that time will be explained with reference to FIGS. 24 to 26. FIG. 24 shows the timing to start fuel injection in the latter period of the compression stroke. The fuel spray 15 injected from the fuel injector 19 is divided into a great fuel penetration component 15c and low penetration component 15d, being injected toward the spark plug and toward the piston respectively. In the top schematic view of the combustion chamber 22, the component of the great spray penetration 15c passes through the center of the combustion chamber, while the component of the little spray penetration 15d is drifting in the vicinity of the fuel injector 19.

Figure 25:
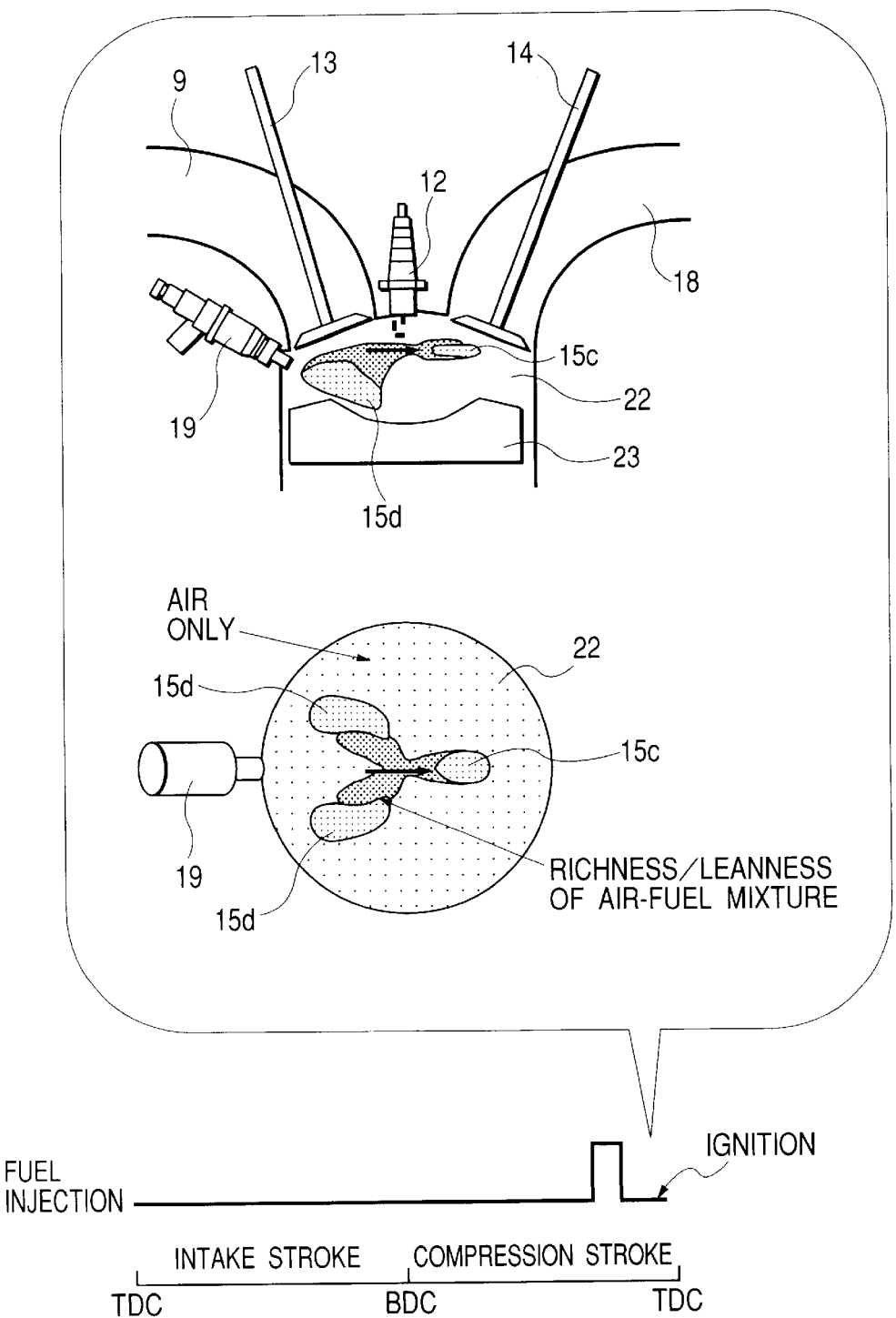
FIG. 25 is a view explaining the spray lead.

FIG. 25 shows a timing a little before the ignition timing, when the position of the fuel spray 15c of high penetration is slightly shifted to the exhaust side. The fuel spray 15d of low penetration is being gradually vaporized, forming a mixture thereabout. There is formed an airstream by the quick movement of the fuel spray 15c, as indicated by the arrow, in the combustion chamber. The air-fuel mixture formed around the spray 15d is led by the airstream toward the spark plug.

Figure 26:
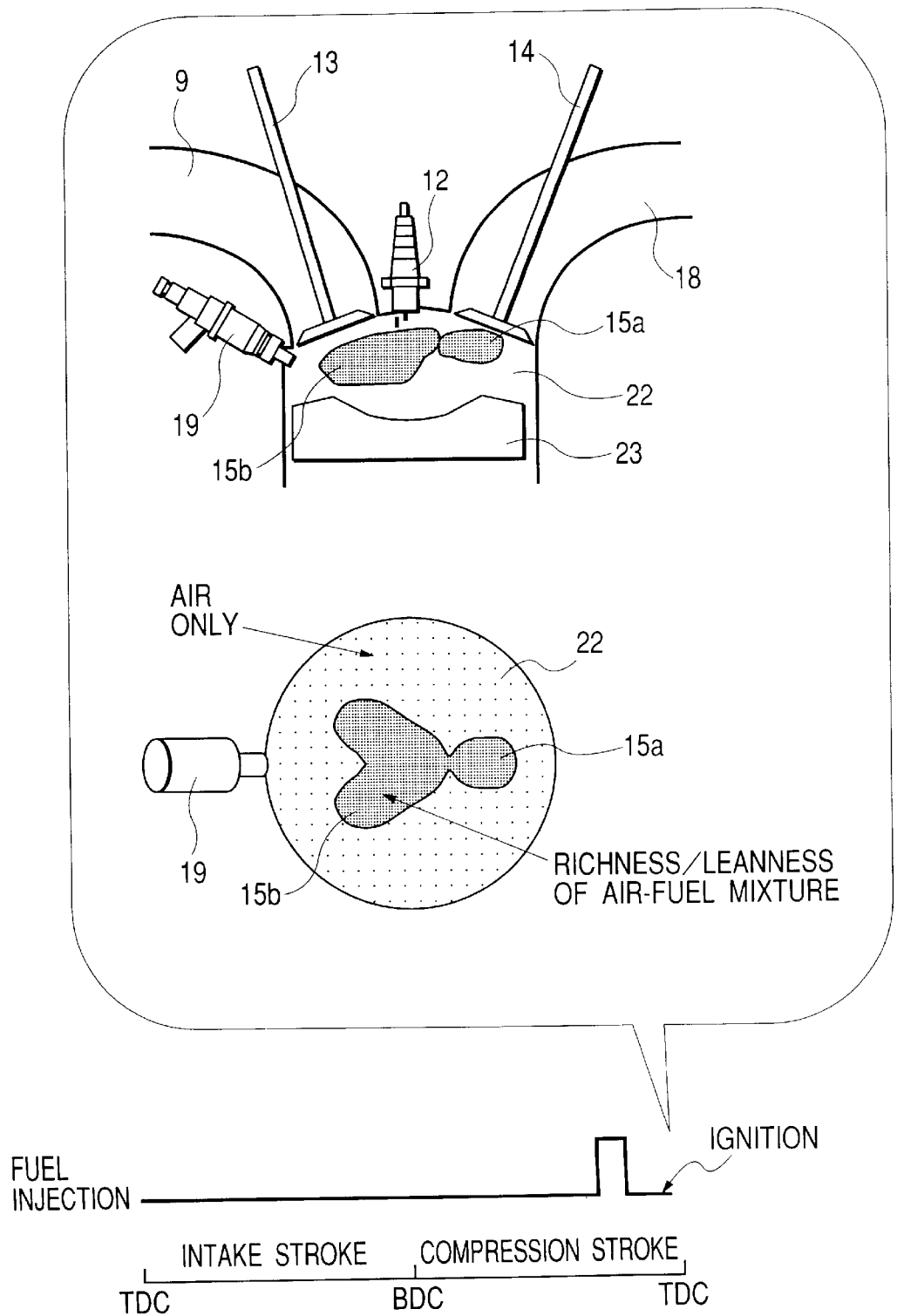
FIG. 26 is a view explaining the spray lead.

FIG. 26 shows the ignition timing. The fuel spray 15c of high penetration is vaporized in the vicinity of the exhaust valve 14 to thereby form the air-fuel mixture 15a, while a vaporized component of the fuel spray 15d of low penetration is borne by the airstream in the combustion chamber, forming the air-fuel mixture 15b around the spark plug. The method of forming the air-fuel mixture in this manner is termed the spray lead. According to the spray lead, the fuel is checked from concentrating to one place to thereby prevent smoke formation by injecting the fuel spray of high penetration toward the spark plug and also by injecting the fuel spray of low penetration toward the piston.

Figure 27:
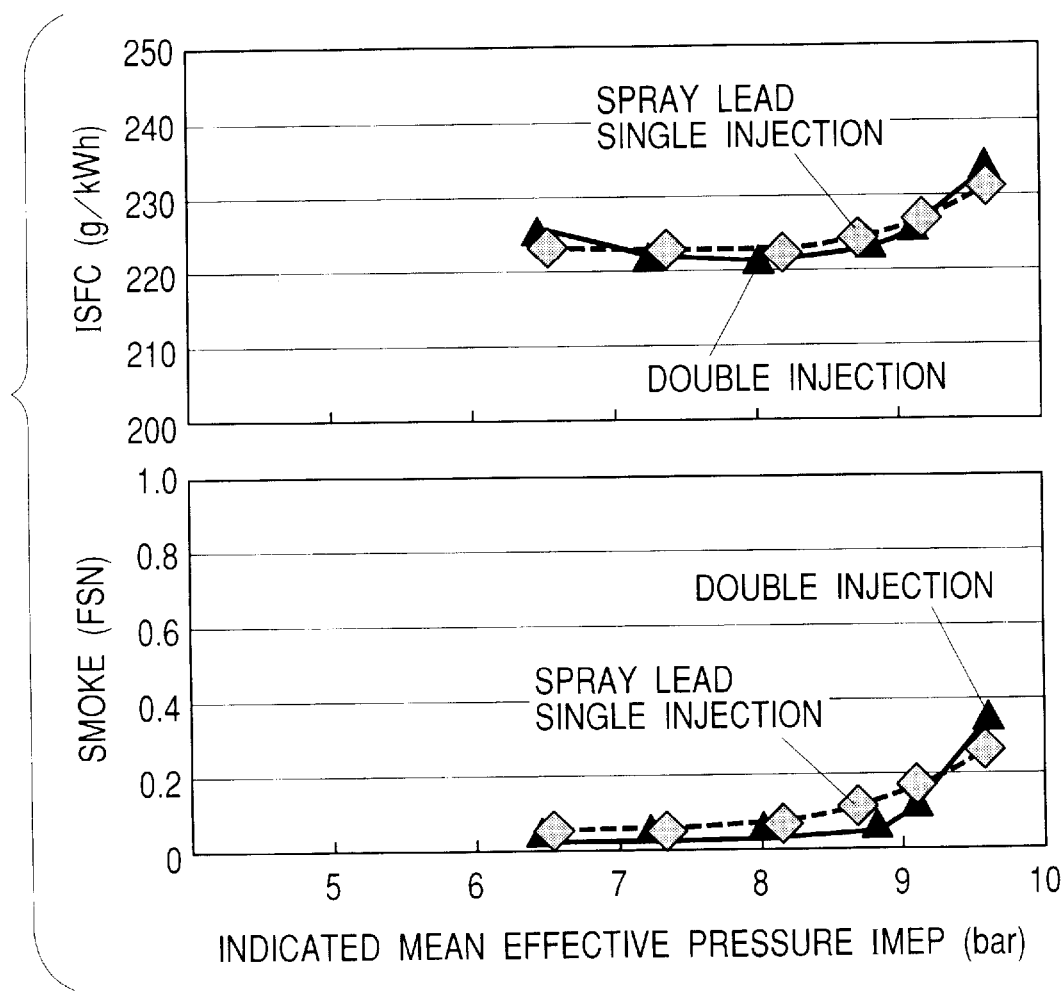
FIG. 27 is a view explaining the effect of the spray lead at the time of stratified combustion.

FIG. 27 shows a result of single injection of the spray lead and double injection previously described. The ejection of smoke is controlled until the engine torque indicated by the Indicated Mean Effective Pressure reaches around 9 bars. The specific fuel consumption curve has a similar tendency, from which it is understood that the mechanisms for forming the air-fuel mixture by both the twice injection and the spray lead have a like role.

Figure 28:
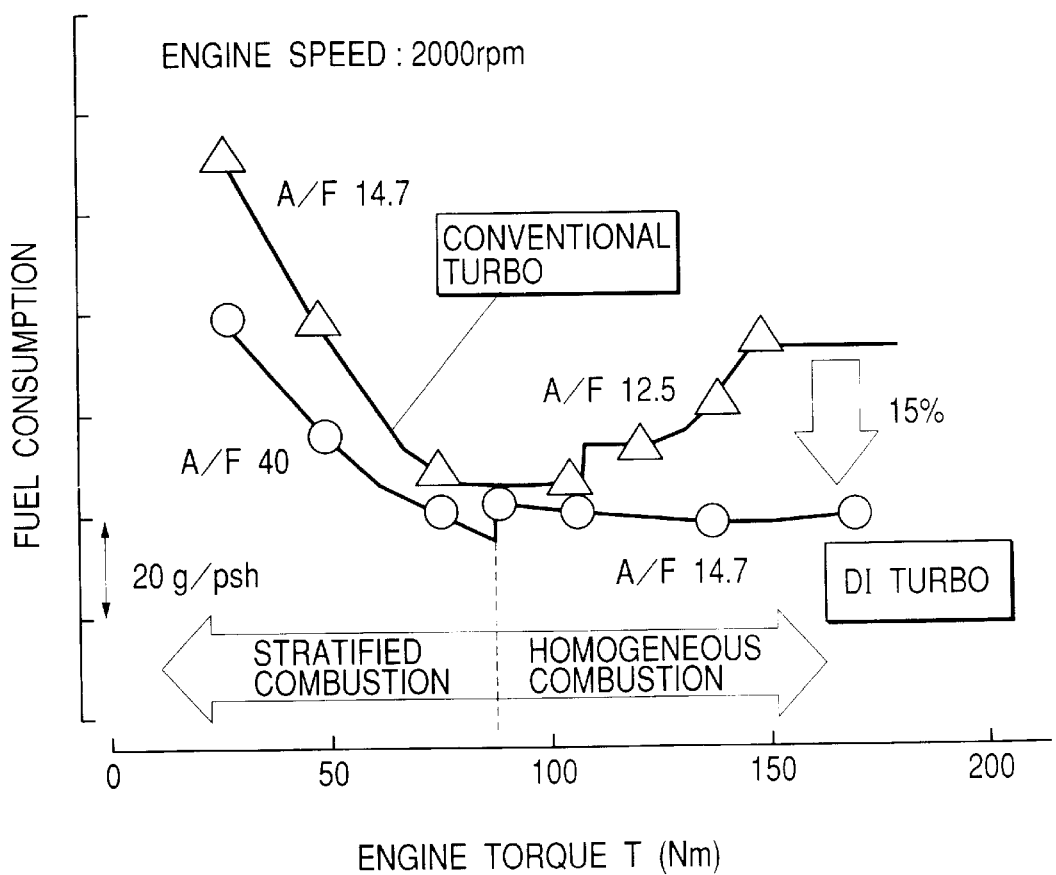
FIG. 28 is a view explaining the effect of this invention.

FIG. 28 shows the advantage of this invention. A conventional turbocharged engine basically operates to perform homogenous combustion regardless of the amount of torque the engine develops, controlling the air-fuel ratio to 14.7 to enrich the mixture during high-load operation for the above-described reason. In the meantime, in the direct-injection turbocharged engine of this invention; the specific fuel consumption cab be reduced by stratified combustion at around the air-fuel ratio of 40 within a range of little engine torque, and within a high-load range where the combustion is changed over to homogenous combustion, the engine can be operated without enriching the air-fuel mixture by the acceleration of residual gas scavenging and air-fuel mixture control. Within the high-load range, it is possible to lower the specific fuel consumption by around 15%.

Figure 29:
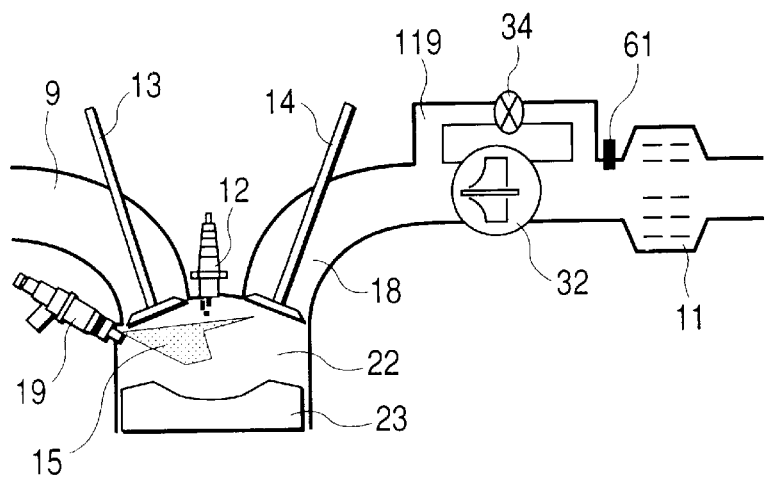
FIG. 29 is a block diagram of the direct-injection engine system provided with a temperature sensor at the upstream of a catalyser.
Figure 30:
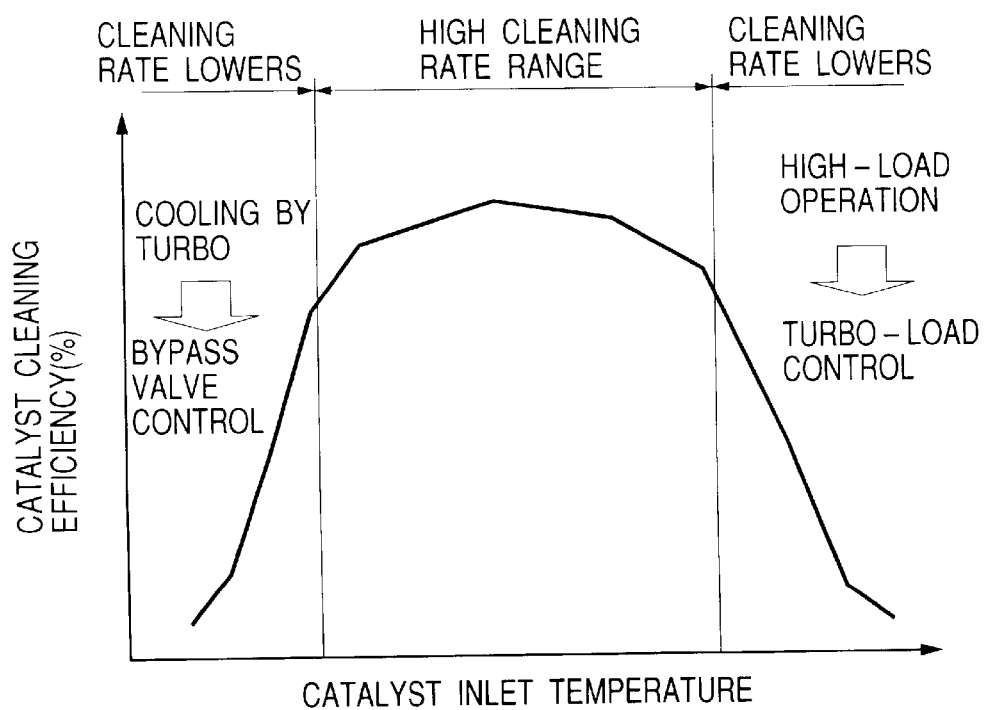
FIG. 30 is a view explaining a catalyser temperature control.

FIG. 29 shows another embodiment of this invention. Recently, the exhaust regulation as well as the fuel consumption regulation has been strengthened. To meet these regulations, it is important to achieve the maximum limit of cleaning performance of the catalyser 11. For this purpose, therefore, a temperature sensor 61 is mounted on the upstream side of the catalyser 11, so that the engine and the turbocharger may be controlled to gain the maximum cleaning efficiency of the catalyser on the basis of the temperature of exhaust gases flowing into the catalyser. FIG. 30 shows a relationship between the inlet temperature and cleaning efficiency of the catalyser 11. Generally, the catalyser is used in the optimum temperature range for cleaning the exhaust gases; the cleaning efficiency will lower if the temperature is high or lower than the optimum temperature. In the configuration of the present embodiment, it is necessary to effectively transmit the heat energy of the exhaust gases to the catalyser in the case of a small quantity of the exhaust gases and a low exhaust gas temperature. When the exhaust gases pass through the turbine 32, the heat of the exhaust gases is deprived of by a turbine housing and an impeller. The temperature, therefore, will drop before the exhaust gases arrive at the catalyser. The bypass control valve 34 is opened to introduce the exhaust gases to the catalyser without passing through the turbine 32, to prevent wasteful heat dissipation to the turbine, thereby enabling the rise of the catalyser temperature. On the other hand, the exhaust gas temperature rises with an increase in the engine load; when there is the possibility that the temperature of the catalyser 11 exceeds the optimum temperature range, the bypass control valve 34 is closed so that all the exhaust gases will pass through the turbine 32, enabling the absorption of the heat of the exhaust gases by the turbine to thereby control the catalyser temperature. Therefore it is possible to control the amount of the exhaust gases which flow to the turbine 32 and the catalyser 11 by controlling the bypass valve as previously stated, and also to keep the catalyser temperature within the range of high cleaning efficiency.

According to this invention, the exhaust gases in the cylinder can be quickly scavenged; therefore the exhaust pressure rise in the high-load range of the engine can be controlled and it is unnecessary to cool with the fuel, thus achieving a turbocharged direct-injection engine of good fuel economy.

Furthermore, within the range of stratified operation, smoking can be controlled and accordingly no knocking will occur.

What is claimed is:

1. A direct-injection engine having:
    a fuel injector for direct injection of fuel into an engine combustion chamber;
    an intake valve and an exhaust valve located at an inlet port and an outlet port of said engine combustion chamber;
    a variable valve mechanism for controlling the valve opening-closing phase of said intake or exhaust valve;
    a turbine mounted in an exhaust passage of said engine and turned with the exhaust gases;
    a compressor mounted in an intake passage of said engine and turned with the turning force of said turbine;
    a bypass passage for bypassing said turbine; and
    a control valve for regulating the flow rate of the exhaust gases flowing into said bypass passage;
    said direct-injection engine being configured to provide an exhaust gas scavenging acceleration which controls, from termination of an exhaust stroke to initiation of air intake stroke, said variable valve mechanism or said control valve to accelerate and expel exhaust gas in said combustion chamber using engine intake air.

2. A direct-injection engine as claimed in claim 1, wherein said exhaust gas scavenging acceleration control mechanism includes said bypass control valve the amount of opening of which is controlled so that the exhaust passage pressure will be lower than the intake passage pressure.

3. A direct-injection engine as claimed in claim 1, wherein said exhaust gas scavenging acceleration control mechanism includes said variable valve mechanism which is controlled so that the overlap period during which both said intake valve and said exhaust valve are open is so controlled as to be long on the retarded side of top dead center of said engine.

4. A direct-injection engine as claimed in claim 1, wherein said exhaust gas scavenging acceleration control mechanism adopted as said injector is an air-assist fuel injector; and the air-assist air is injected from said fuel injector into said combustion chamber so that the combustion chamber pressure will be higher than the exhaust passage pressure.

5. An internal combustion engine, comprising:
    a piston arranged to reciprocate in a combustion chamber;
    a fuel injector operative to directly inject fuel into said combustion chamber;
    an intake port;
    an intake valve arranged to open said intake port during an intake stroke, and to lead intake air into said combustion chamber through said intake port;
    an exhaust port for discharging exhaust gas from said combustion chamber;
    an exhaust valve arranged to open said exhaust port during an exhaust stroke, and to close said exhaust port after initiation of a downward stroke of said piston;
    a turbine configured to be turned with high-temperature exhaust gas energy;
    a turbocharger configured to turn with a turning force of said turbine and to supercharge the intake air into said combustion chamber;
    a turbine bypass passage; and
    a bypass control valve configured to open said turbine bypass passage at least from an end of the exhaust stroke to the initiation of the intake stroke.

* * * * *